No. 895,160. PATENTED AUG. 4, 1908.
E. D. CARTER.
AUTOMATIC WEIGHING MACHINE.
APPLICATION FILED MAR. 29, 1907.
3 SHEETS—SHEET 1.
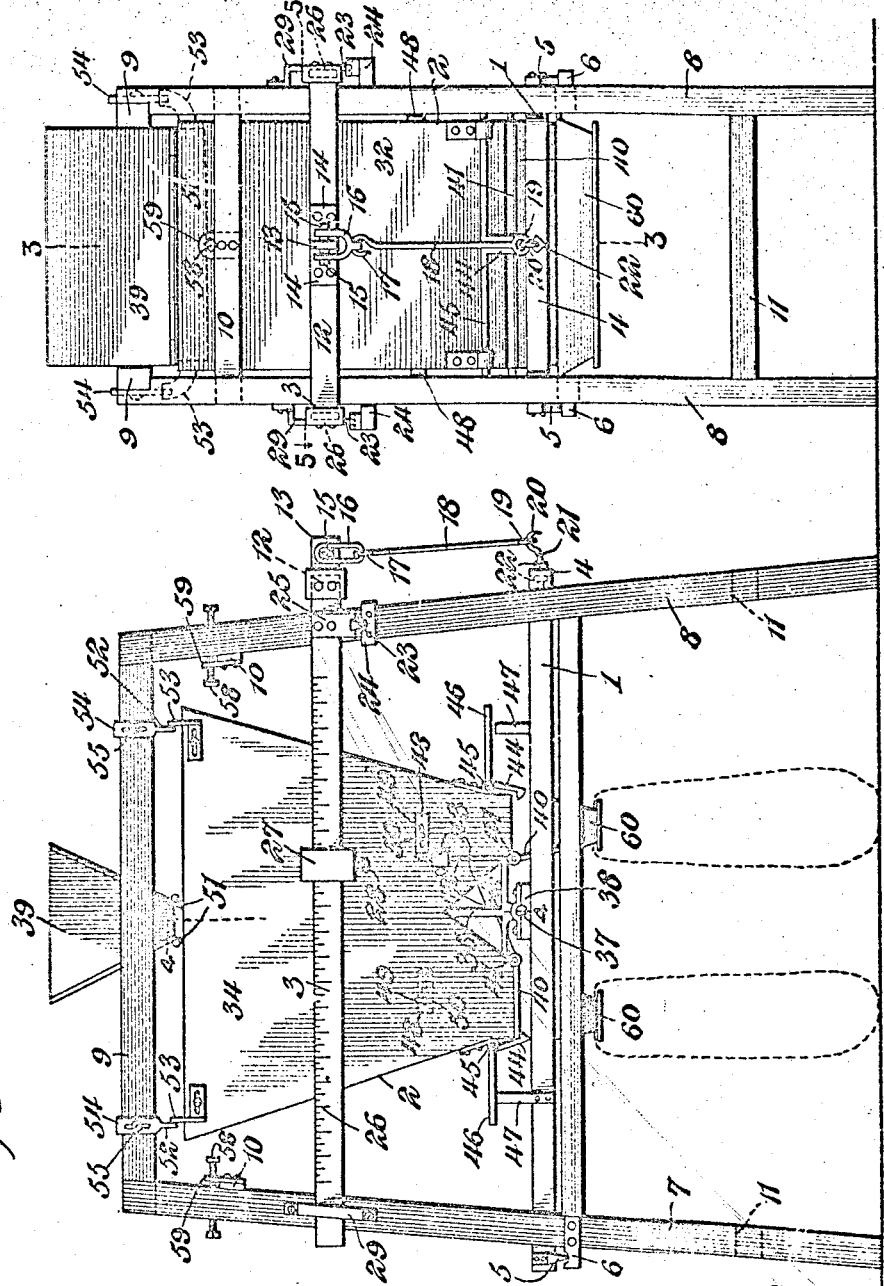
Witnesses
Howard D. Orr
H. F. Riley
Edward D. Carter, Inventor,
By E. G. Siggers
Attorney

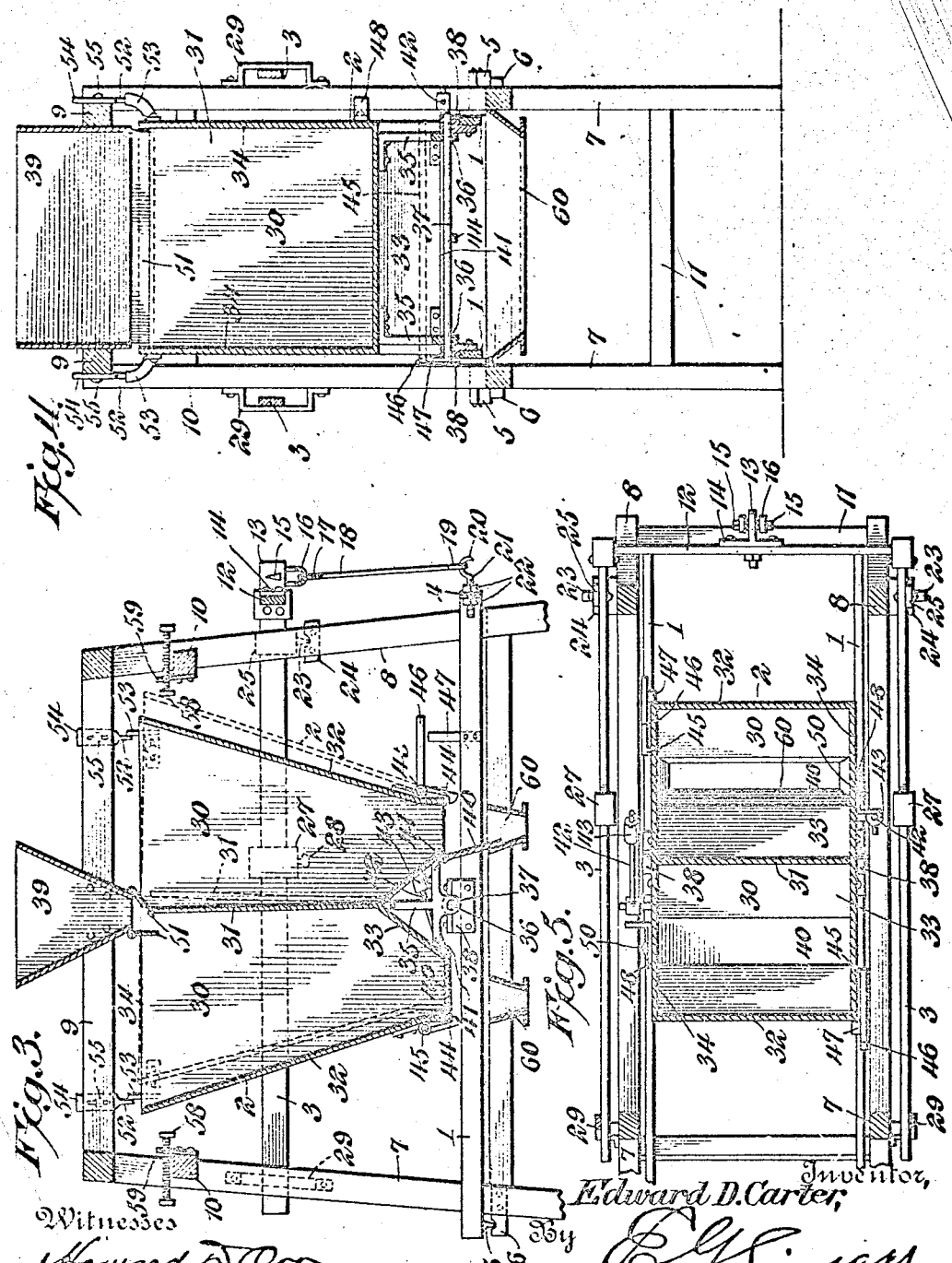

No. 895,160.　　　　　　　　　　　　　　　　　　　PATENTED AUG. 4, 1908.
E. D. CARTER.
AUTOMATIC WEIGHING MACHINE.
APPLICATION FILED MAR. 29, 1907.
3 SHEETS—SHEET 3.
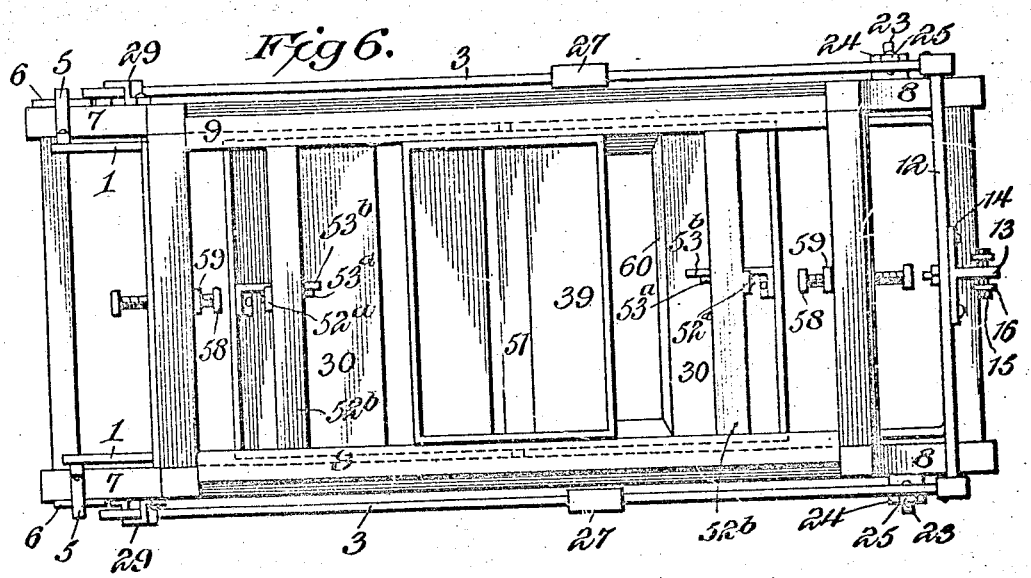
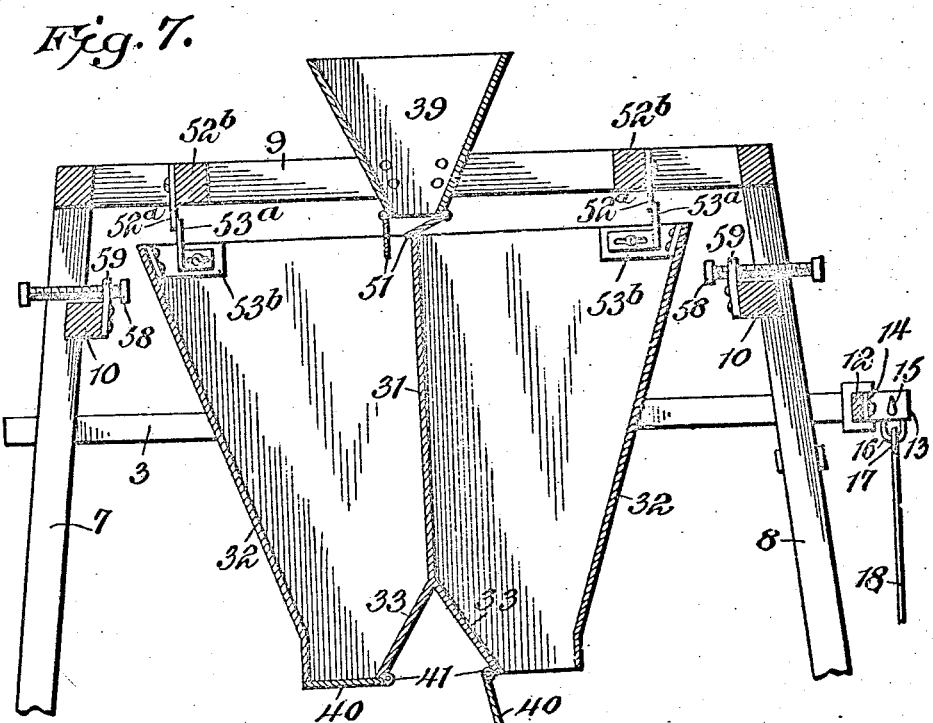
Witnesses
Howard D. Orr
H. F. Riley
Edward D. Carter, Inventor,
By E. G. Siggers,
Attorney

UNITED STATES PATENT OFFICE.

EDWARD D. CARTER, OF BRENHAM, TEXAS.

AUTOMATIC WEIGHING-MACHINE.

No. 895,160.   Specification of Letters Patent.   Patented Aug. 4, 1908.

Application filed March 29, 1907. Serial No. 365,388.

*To all whom it may concern:*

Be it known that I, EDWARD D. CARTER, a citizen of the United States, residing at Brenham, in the county of Washington and State of Texas, have invented a new and useful Automatic Weighing-Machine, of which the following is a specification.

The invention relates to improvements in automatic weighing machines.

The object of the present invention is to provide a simple, inexpensive and accurate automatic weighing machine, having a plurality of compartments to receive the material to be weighed, and adapted to lessen the flow of material as the scale beam approaches the poising point, and capable of rapidly changing the position of the compartments to shift the full compartment from beneath the supply spout or hopper and transfer the empty compartment to the same, whereby an accurate weighing of the material is effected without entirely cutting off the flow of the material and permitting the same to clog within the supply spout or hopper.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is an elevation of an automatic weighing machine, constructed in accordance with this invention.
Fig. 2 is an end elevation of the same. Fig. 3 is a vertical sectional view, taken substantially on the line 3—3 of Fig. 2. Fig. 4 is a vertical sectional view, taken substantially on the line 4—4 of Fig. 1. Fig. 5 is a horizontal sectional view, taken substantially on the line 5—5 of Fig. 2. Fig. 6 is a plan view, illustrating a modification of the invention. Fig. 7 is a vertical sectional view of the same.

Like numerals of reference designate corresponding parts in all the figures of the drawings.

The weighing mechanism consists essentially of a lower approximately horizontal pivoted frame 1 upon which a receptacle 2 is mounted, and an upper scale beam 3, which is connected at one end with the pivoted frame 1. The pivoted frame 1 is composed of two sides and a connecting transverse portion 4, located at one end of the pivoted frame, and the sides thereof are provided at the other end of the pivoted frame with downwardly projecting knife edged pivots 5, which are arranged in suitable bearings 6. The bearings 6 are secured to two of the legs or standards 7 of a main frame. The main frame is provided with inclined corner standards 7 and 8, connected at their upper ends by horizontal top bars 9, and at points between their ends by upper and lower cross bars 10 and 11. The main frame, however, may be of any other preferred construction, as will be readily understood.

The scale beam, which is in the form of a pivoted frame, is provided with spaced sides, located exteriorly of the main frame and connected at one end of the beam by a transverse bar or member 12, to which is secured a short centrally arranged outwardly projecting arm 13. The arm 13, which is provided with laterally extending attached portions 14, has knife edged pivots 15, extending laterally from the arm at a point beyond the transverse bar or member 12. The knife edged pivots 15 receive a substantially U-shaped link 16, provided at opposite sides with openings into which the said pivots 15 extend, and the lower portion of the link 16 is engaged by a hook 17 of a rod 18, which is provided at its lower end with an eye 19. The eye 19 receives a hook 20 of the lower pivoted frame 1, which has its sides arranged between the standards of the main frame. The hook 20 is provided with a threaded shank 21, piercing the transverse portions 4 of the pivoted frame 1 at the center of the said transverse portion, and adjustably secured to the same by nuts 22. The nuts are arranged at the inner and outer faces of the transverse portions 4 of the pivoted frame 1, and the connection between the lower end of the rod 18 and the pivoted frame 1 enables the weighing machine to be adjusted, when the same is found to be weighing either light or heavy.

The sides of the scale beam are provided adjacent to the transverse bar or member with downwardly projecting knife edged pivots 23, mounted in suitable bearings 24 of the standard 8 and having enlarged shanks or plates 25, which are secured to the sides of the scale beam, but the knife edged pivots 23 may be connected with the sides of the scale beam in any other preferred manner. The sides of the scale beam are provided with suitable graduations 26 and have adjustable weights 27, slidably mounted on them and provided with set screws 28 for securing the weights in their adjustment. Either one or both of the weights may be moved outwardly along the sides of the scale beam to arrange the machine for weighing a charge of material of the desired weight, and the free ends of the sides of the scale beam operate in suitable guides or keepers 29, mounted on the standards 7 of the main frame and limiting the oscillation of the scale beam.

The receptacle is divided into two compartments 30 by a centrally arranged partition 31, and the end walls 32 are downwardly and inwardly inclined. The partition 31 is provided with a forked lower portion 33, forming inclined walls at the lower ends of the compartments 30. The side walls 34 of the receptacle are open or cut away between the forked portions 33, and the receptacle is provided with brackets 35, having bearing openings 36 for the reception of a transverse shaft 37, which is mounted in suitable bearings 38 of the pivoted frame 1. The brackets 35 are provided with vertically and horizontally disposed arms, which are suitably secured to the receptacle. The receptacle is adapted to oscillate on the transverse shaft to carry its compartments successively beneath a supply chute or hopper 39, suitably mounted between the top bars 9 of the main frame.

The compartments 30 of the receptacle are provided at their lower ends with hinged doors or gates 40, having shafts or pintles 41 at their inner edges. The shafts or pintles, which are suitably mounted on the receptacle, are provided with weighted arms 42, located at the opposite sides of the receptacle so as not to interfere with the movement of each other, and adapted to close the doors or gates automatically, when the compartment is empty. The weights 43 are slidably mounted on the arms 42 and are secured in their adjustment by set screws.

The hinged doors or gates are automatically locked in their closed position by means of catches 44, consisting of arms depending from horizontal shafts or pivots 45 and provided at their lower ends with beveled heads for engaging the doors or gates at the free edges thereof, as clearly illustrated in Fig. 1 of the drawings. The shafts or pivots 45 of the catches are provided with outwardly extending arms 46, located above and arranged to engage relatively fixed tripping devices 47, consisting of arms or pieces secured to the lower pivoted frame, and arranged in the path of the arms 46 of the catches. The outwardly extending arms 46 of the catches have sufficient weight to swing the catches inwardly into position for engaging the free edges of the hinged doors or gates, and the latter are adapted to automatically engage the beveled heads of the catches.

The oscillatory movement of the weighted arms 42 of the hinged gates or doors is limited by adjustable stops 48, mounted on the receptacle at the opposite sides thereof and consisting of horizontally disposed substantially L-shaped plates or members, provided with attachment portions and having outwardly extending portions arranged to engage the weighted arms to prevent the same from swinging beyond the center. The attachment portions are provided with longitudinal slots 49, and are adjustably secured to the receptacle by means of screws 50, which enable the stops to be moved inwardly or outwardly to secure the desired operation of the weighted arms. The outwardly extending portions of the weighted arms are adapted, when the receptacle is oscillated, to swing the weighted arms towards the center of the receptacle to effect a positive closing of the hinged gates or doors.

The supply spout or chute is provided at opposite sides with depending shutters 51, hinged at their upper edges to the supply spout or chute and extending below the plane of the upper edge of the central partition 31, and arranged to be operated by the same. When the oscillatory receptacle is at the limit of its movement in one direction, as illustrated in dotted lines in Fig. 3 of the drawings, the hinged shutters hang in a vertical position and are located beyond the central partition. As soon as there is sufficient material within the compartment, beneath the supply spout or hopper, to over-balance and oscillate the receptacle, the latter is swung from the position illustrated in dotted lines in Fig. 3 to that shown in full lines. This partial swinging of the receptacle carries the central partition into engagement with the adjacent hinged shutter, which is partially closed to lessen the flow or feed of the material, so that as the scale beam approaches the poising point, the material will be fed slowly into the receptacle, whereby the accuracy of the weighing machine is greatly increased. Also as the feed or flow of the material is not entirely cut off during the continuous weighing operations, there will be no liability of the material clogging within the supply spout or hopper. This oscillatory movement of the receptacle is limited or interrupted by means of stops or catches 52, arranged in the path of lugs or projections 53 of the receptacle. Both the lugs or projections 53 engage both of the stops or catches 52 at the right hand side thereof when the left hand compartment is filling, and they both engage the opposite faces of the stops or catches 52 when the other compartment is filling. The stops or catches, which are located at opposite sides of the receptacle, are provided with slotted shanks or plates 54, which are adjustably secured to the horizontal top bars 9 by means of screws 55, or other suitable fastening devices. These slotted plates or shanks 54 are arranged vertically, and the stops or catches are vertically adjustable to secure the desired engagement of the same with the lugs or projections of the receptacle. The lugs or projections 53, which are also provided with slotted plates or shanks, are adjustable horizontally to engage the stops or catches 52 at the proper time to limit the initial oscillatory movement of the receptacle. Instead of employing two sets of catches or lugs at each end of the receptacle, as illustrated in Figs. 1 to 5 inclusive, the weighing machine may be equipped with a single set, as illustrated in Figs. 6 and 7 of the drawings. When the single set is employed, the stops or catches 52ª and the lugs or projections 53ª are arranged centrally of the machine and are adjustable as before described. The stops or catches 52ª are mounted on cross bars 52ᵇ of the said frame, and suitable brackets 53ᵇ are provided for supporting the lugs or projections 53ª.

When the receptacle receives its full charge of material, the scale beam is raised and the receptacle moves downward beyond the stops or catches, and it swings quickly to the limit of its oscillatory movement, thereby carrying the empty compartment beneath the supply spout or hopper. This final oscillatory movement operates to produce a positive closing of one of the hinged gates or doors, and it carries the outwardly extending arm of the catch of the other hinged gate or door into engagement with the trip to discharge the contents of the full compartment. As soon as the catch is disengaged from the hinged door or gate, the weight of the material opens the same. The time between the end of the initial oscillatory movement and the final oscillatory movement of the receptacle may be gaged or controlled by opposite adjustable stops 58, consisting of screws 65 mounted in threaded perforations of plates or brackets 59 and arranged to receive the receptacle at the limit of the final oscillatory movement thereof. The plates or brackets 59 are mounted on the top cross piece 10, and by adjusting the screws outwardly the weight of the material necessary to produce the initial oscillatory movement of receptacle is increased, thereby lessening the amount of material necessary to effect the final oscillatory movement of the receptacle.

The main frame is provided below the receptacle with a pair of bag receiving chutes 60, having outwardly extending flanges spaced apart. The flanges form a supporting ledge for a bag or sack, and when the weighing machine is rapidly operated, two persons may advantageously handle the bags or sacks. Also the discharge chutes are arranged in convenient position for enabling one person to handle the bags or sacks. The hinged doors or gates are arranged to swing downwardly against the inner side walls of the bag receiving chutes, and they assist in directing the material into the same.

Having thus fully described my invention, what I claim as new and desire to secure by Letters Patent, is:—

1. A weighing machine comprising a main frame, a horizontal frame arranged within the main frame, means for pivoting the horizontal frame to the main frame at one end, a scale beam arranged outside the main frame and composed of two bars connected by a cross bar at one end, means for pivoting the scale beam at the end opposite the horizontal frame, and means for connecting the scale beam with the horizontal frame.

2. A weighing machine comprising a main frame, an approximately horizontal frame extending across the main frame and pivoted at one end to the same at one side thereof, a scale beam fulcrumed at the opposite side of the main frame, a link connecting the free end of the main frame with the scale beam, means carried by the horizontal frame for adjusting the link inwardly and outwardly, and a receptacle mounted on the horizontal frame at a point between the ends thereof.

3. In a weighing machine, the combination of a movable frame pivoted at one end, a hook located at the other end of the frame having a threaded shank piercing the same, nuts arranged on the threaded shanks and securing the hook in its adjustment, a receptacle mounted on the pivoted frame, a scale beam located above the pivoted frame, and a link connection extending from the scale beam and engaging the said hook.

4. In a weighing machine, the combination with weighing mechanism, of an oscillatory receptacle movable laterally and upwardly and downwardly with the weighing mechanism, means located in the path of the receptacle for checking or stopping the lateral oscillation of the receptacle between the ends of such lateral movement during the weighing operation and when the receptacle has received a portion of its charge, and spaced means arranged to receive the receptacle at the ends of its oscillatory movements.

5. In a weighing machine, the combination with an oscillatory receptacle movable upwardly and downwardly and also laterally, and two series of stops at each side, one series being engaged and disengaged by the receptacle in the upward and downward movement thereof, and the other series by its lateral movement only, the last-mentioned stops engaging the receptacle at the end of its lateral movement and lying outside the first-mentioned stops.

6. In a weighing machine, the combination with weighing mechanism, of an oscillatory receptacle movable upwardly and downwardly with the weighing mechanism, means located in the path of the receptacle for checking or stopping the oscillatory movement of the receptacle between the ends thereof, and adjustable stops arranged to receive the receptacle at the ends of its oscillatory movement.

7. In a weighing machine, the combination with weighing mechanism, of an oscillatory receptacle mounted on and movable upwardly and downwardly with the weighing mechanism, adjustable stops between which the receptacle oscillates, catches located at intermediate points between the stops, and means carried by the receptacle for engagement with the catches for checking or stopping the oscillatory movement at an intermediate point, said means being disengaged from the catches by the downward movement of the receptacle.

8. In a weighing machine, the combination with weighing mechanism, of an oscillatory receptacle movable upwardly and downwardly with the weighing mechanism, projections mounted on the receptacle and adjustable inwardly and outwardly, and fixed catches arranged in the path of the projections and adjustable upwardly and downwardly, said projections being carried out of engagement with the catches by the downward movement of the receptacle.

9. In a weighing machine, the combination with weighing mechanism, of an oscillatory receptacle having a plurality of compartments and carried by the weighing mechanism, means for feeding material to the receptacle, said means embodying movable shutters arranged in the path of the receptacle and automatically operated by the same for reducing the flow of material as the weighing machine approaches the poising point, and means for checking or stopping the oscillatory movement of the receptacle while the same is in engagement with the said shutters.

10. In a weighing machine, the combination with weighing mechanism, of an oscillatory receptacle having a plurality of compartments and carried by the weighing mechanism, and means for feeding material to the receptacle, said means having movable shutters arranged in the path of and automatically operated by the receptacle for reducing the flow of material as the weighing machine approaches the poising point.

11. In a weighing machine, the combination with weighing mechanism, of an oscillatory receptacle having a plurality of compartments and carried by the weighing mechanism, and means for feeding material to the receptacle, said means having depending hinged shutters arranged in the path of and automatically operated by the receptacle for reducing the flow of material.

12. In a weighing machine, the combination with weighing mechanism, of an oscillatory receptacle carried by the weighing mechanism and having a partition dividing the receptacle into compartments, and a supply spout or chute having hinged shutters arranged to be automatically operated by the partition.

13. In a weighing machine, the combination with weighing mechanism, of an oscillatory receptacle movable upwardly and downwardly with the weighing mechanism, said receptacle having a compartment dividing it into a plurality of compartments, catches arranged to check the oscillatory movement of the receptacle at an intermediate point, and a supply spout or chute having hinged shutters arranged in the path of the partition and adapted to be operated by the same, said receptacle being carried out of engagement with the catches by its downward movement.

14. In a weighing machine, the combination of weighing mechanism, a plurality of bag-receiving spouts, and an oscillatory receptacle carried by the weighing mechanism and arranged to discharge alternately into the said spouts, said receptacle being provided with hinged doors or gates to engage and direct the material into said spouts.

15. A weighing machine comprising a horizontal frame pivoted at one end, a receptacle having two compartments and pivoted to the frame at a point between the said compartments, gates for said compartments at the bottom, a scale beam located above the pivoted frame and pivoted at the end opposite the pivotal point of the said frame, and connections between the pivoted end of the beam and the free end of the frame.

16. A weighing machine comprising a horizontal frame pivoted at one end, a receptacle having two compartments and pivoted to the frame at a point between the said compartments, gates for said compartments at the bottom, tripping means carried by the frame to operate the gates, a scale beam located above the pivoted frame and pivoted at the end opposite the pivotal point of the said frame, and connections between the pivoted end of the beam and the free end of the frame.

In testimony that I claim the foregoing as my own, I have hereto affixed my signature in the presence of two witnesses.

EDWARD D. CARTER.

Witnesses:
L. L. HYER,
H. H. WALKER.